United States Patent
Wilson et al.

(10) Patent No.: US 9,978,189 B2
(45) Date of Patent: May 22, 2018

(54) DEVICE AND METHOD FOR CHECKING AN AIRCRAFT LANDING GEAR SHOCK ABSORBER

(71) Applicant: AIRBUS OPERATIONS LIMITED, Bristol (GB)

(72) Inventors: Fraser Wilson, Wotton-Under-Edge (GB); Scott Wallis, Bristol (GB); Neil Terence Frost, Bath (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days. days.

(21) Appl. No.: 14/404,250

(22) PCT Filed: Apr. 23, 2013

(86) PCT No.: PCT/GB2013/051362
§ 371 (c)(1),
(2) Date: Nov. 26, 2014

(87) PCT Pub. No.: WO2013/178998
PCT Pub. Date: Dec. 5, 2013

(65) Prior Publication Data
US 2015/0154819 A1    Jun. 4, 2015

(30) Foreign Application Priority Data
May 29, 2012 (GB) .................................... 1209490.0

(51) Int. Cl.
*G07C 5/08* (2006.01)
*G01M 17/04* (2006.01)
(Continued)

(52) U.S. Cl.
CPC ........... *G07C 5/0808* (2013.01); *B64D 45/00* (2013.01); *B64F 5/60* (2017.01); *G01M 17/04* (2013.01);
(Continued)

(58) Field of Classification Search
CPC .................. G07C 5/0808; B64D 45/00; B64D 2045/0085; B64F 5/0045; G01M 17/04; B64C 25/58
See application file for complete search history.

(56) References Cited

U.S. PATENT DOCUMENTS

| 5,521,827 A | 5/1996 | Lindberg et al. |
| 5,548,517 A | 8/1996 | Nance |
(Continued)

FOREIGN PATENT DOCUMENTS

| EP | 1186877 A2 | 3/2002 |
| WO | 94/05969 A1 | 3/1994 |
(Continued)

OTHER PUBLICATIONS

International Search Report dated Feb. 27, 2014 in International Application No. PCT/GB2013/051362, filed May 23, 2013.
(Continued)

*Primary Examiner* — Aaron L Troost
(74) *Attorney, Agent, or Firm* — Hauptman Ham, LLP (57) ABSTRACT

An electronic device checks the pressure of an aircraft landing gear oleo by means of a camera capturing and processing an image of the oleo. An image recognition module processes the oleo image to extract a measure of the amount of extension of the oleo. This measure is then processed together with a measure of oleo temperature to calculate a pressure value representative of the expected pressure of the gas within the oleo, which can then be compared with another measurement of oleo pressure to determine whether the two are consistent or whether the oleo might be under- or over-filled with gas. The electronic device may be in the form of a hand-held smart phone or tablet device appropriately programmed with software.

17 Claims, 9 Drawing Sheets

(51) Int. Cl.
  *B64D 45/00* (2006.01)
  *B64F 5/00* (2017.01)
  *B64C 25/58* (2006.01)
  *B64F 5/60* (2017.01)
(52) U.S. Cl.
  CPC ...... *B64C 25/58* (2013.01); *B64D 2045/0085* (2013.01)

(56) References Cited

U.S. PATENT DOCUMENTS

| | | | |
|---|---|---|---|
| 6,128,951 A | 10/2000 | Nance | |
| 6,161,419 A | 12/2000 | Langlechner | |
| 8,042,765 B1* | 10/2011 | Nance | B64C 25/00 244/100 R |
| 2003/0215128 A1* | 11/2003 | Thompson | G06F 17/30268 382/141 |
| 2008/0033607 A1 | 2/2008 | Zeliff et al. | |
| 2009/0237245 A1* | 9/2009 | Brinton | G07C 5/008 340/540 |
| 2012/0053783 A1* | 3/2012 | Nance | G01M 17/04 701/33.1 |
| 2014/0300722 A1* | 10/2014 | Garcia | G01B 11/02 348/77 |
| 2015/0154819 A1* | 6/2015 | Wilson | G01M 17/04 701/33.2 |

FOREIGN PATENT DOCUMENTS

| | | |
|---|---|---|
| WO | 01/38843 A1 | 5/2001 |
| WO | 01/77637 A1 | 10/2001 |

OTHER PUBLICATIONS

Written Opinion dated Feb. 27, 2014 in International Application No. PCT/GB2013/051362, filed May 23, 2013.
UKIPO Search Report dated Sep. 23, 2012, in GB Application No. 1209490.0.

* cited by examiner

DEVICE AND METHOD FOR CHECKING AN AIRCRAFT LANDING GEAR SHOCK ABSORBER

RELATED APPLICATIONS

The present application is a National Phase of International Application Number PCT/GB2013/051362, filed May 23, 2013, and claims priority from Great Britain Application Number 1209490.0, filed May 29, 2012.

BACKGROUND OF THE INVENTION

The present invention concerns a device and method for checking an aircraft landing gear shock absorber, for example the amount of gas in the landing gear shock absorber and/or the pressure of such gas. More particularly, but not exclusively, this invention concerns a device and method for measuring the pressure in an aircraft landing gear shock absorber and comparing that measurement with an independently made measure in order to ascertain whether an aircraft landing gear shock absorber is filled with the correct amount of gas or not. The invention also concerns a software product for programming a device so that it can perform such a function.

It is desirable for the pressure in aircraft landing gear shock absorbers to be within certain limits. If the pressure within a landing gear shock absorber were to be too low, the shock absorber would be at risk of "bottoming out" during landing, for example, risking damage to the landing gear. If the pressure within a landing gear shock absorber were to be too high, the ability of the shock absorber to dampen peak loading may be reduced. Furthermore, there is a risk of the shock absorber rupturing under the application of a large load (as may be applied if the aircraft is heavily laden and/or on a hard landing). Many landing gear shock absorbers are not fitted with pressure sensors. If pressure sensors are fitted to a landing gear shock absorber, then the pressure sensors are sometimes located in positions which may be difficult to access, for example, close to the fuselage or at the very bottom of the landing gear. As a secondary check to determine pressure, the ground crew typically measure the distance between two parts of the shock absorber. This distance, coupled with knowledge of the aircraft's weight and the ambient temperature, may be used to provide an estimate of the pressure in the shock absorber. This measurement is sometimes known by those skilled in the art as "the H measurement" because it involves measuring the height of one part of the shock absorber in relation to another part. This measurement is prone to significant error, not least because it is difficult to measure the distance between the two parts of the shock absorber with any accuracy. Furthermore, information relating the distance measured to the pressure in the shock absorber is contained on placards which are attached to the landing gear. These placards are often difficult to read, which may make it difficult to determine the pressure from the distance measurement taken. U.S. Pat. No. 6,128,951 discloses the measurement of pressure in landing gear shock absorbers using pressure sensors. U.S. Pat. No. 6,128,951 also discloses the use of a radial variable digital transducer to measure landing gear shock absorber compression and extension.

It is an aim of the present invention to ameliorate one or more of the problems mentioned above. Alternatively or additionally, it is an aim of the present invention to provide an improved or alternative means of assessing the landing gear pressure, which can complement the measurement made with the pressure sensor that measures the landing gear internal pressure.

SUMMARY OF THE INVENTION

According to a first aspect of the invention there is provided an electronic device for checking a characteristic of the gas in an aircraft landing gear oleo, the device comprising a camera, an image recognition module, a temperature input module, a processing module, relationship data stored in the device concerning the relationship between (i) the temperature of the oleo, (ii) the extension of the oleo and (iii) the gas pressure within the oleo, and an output device, wherein the device is so arranged that in use: the camera captures an image from which an extension of the oleo may be derived, the image recognition module processes the image to extract a measure of the amount of extension of the oleo, the processing module uses (a) a temperature inputted via the temperature input module and (b) the relationship data, and one or both of (c) the measure of the amount of extension of the oleo and (d) an independent pressure measurement concerning the pressure of gas in the oleo, to create an output, from which output a user may ascertain whether the characteristic of the gas in the aircraft landing gear oleo is at an acceptable level or not, and the device causes the output to be provided by the output device. The characteristic of the gas in an aircraft landing gear oleo may be one or more of its pressure, the volume of gas, the weight of the gas, the number of moles of gas, or any combination of the foregoing.

The device may be used to compare the measure of the amount of extension of the oleo against a predicted amount of extension of the oleo calculated from an independent measurement of the pressure of gas in the oleo. Alternatively, or additionally, the measure of the amount of extension of the oleo may be used to predict an expected pressure which can then be compared against an independent measurement of the pressure of gas in the oleo. For example, the processing module may be programmed to use the measure of the amount of extension of the oleo, a temperature inputted via the temperature input module, and the relationship data to calculate a pressure value representative of the expected pressure of the gas within the oleo. In such a case, the independent measurement of the pressure of gas in the oleo need not be processed or inputted into the device of course, and a manual comparison may be made by the user.

The processing module may be arranged to calculate a further parameter from which an assessment may be made by the user as to whether the characteristic of the gas in the aircraft landing gear oleo is at an acceptable level or not.

A device according to certain embodiments of the invention thus advantageously provides for the semi-automatic checking of a characteristic of the gas, thus enabling an accurate, quick and reliable check of whether there is under- or over-filling of the oleo with gas. One possible advantage is that such a device can reduce the possibility of human error, either in the physical measuring of the "H-value" for example, or in interpreting the placard showing the load-stroke characteristics (which typically has several pressure versus H-value curves of the oleo for a range of different temperatures). Such placards could be rendered redundant, without adding any mass to the aircraft.

The device may be arranged to output a predicted pressure of the oleo gas.

The device is conveniently in the form of a handheld electronic device. The electronic device may have other functionality not related to oleo pressure checking. For example, the device may be able to make telephone calls. The device may be able to connect wirelessly to a computer network. The device may include a programmable computer. The device is conveniently in the form of a smart phone, computer tablet or similar device. Such devices are conveniently provided with sufficient processing power and memory, output devices, and good quality cameras as to be readily convertible, by means of appropriate software, into a device according to the present invention.

The image recognition module may be provided by means of one or more software-based applications installed on the device. The processing module may be provided by means of one or more software-based applications installed on the device. The temperature input module may be provided by means of one or more software-based applications installed on the device. The temperature input module may be configured such that a user may simply manually enter the temperature via a user interface, for example a keypad on the device. The temperature input module may be configured such that the temperature is measured by means of a sensor attached or otherwise linked to the device. The device may thus include a temperature measuring module, which may for example interface with a suitable thermometer or temperature sensor. There may be a temperature gauge permanently fixed to the exterior of the oleo which the temperature measuring module interacts with.

The device may be configured and arranged as to be suitable for measuring the extension of an oleo strut comprising an inner sliding tube and an outer casing in which the inner sliding tube slides, the exposed region of the inner sliding tube being indicative of the amount of extension of the oleo. In such a case the device may also be so arranged that the image recognition module and the processing module together enable the amount of extension of the oleo to be ascertained by using a measured width and height of the part of the image captured by the camera which defines the exposed region of the inner sliding tube. This could for example be combined with a known value of the diameter of the inner sliding tube being measured to produce an H-value. The exposed region of the inner sliding tube is typically relatively shiny compared to the rest of the landing gear and may therefore be well-suited to edge detection image processing algorithms. Depending on the camera lens used, the geometry and orientation of the oleo and/or camera relative to each other, the exposed region when extracted by the image processing module may not be perfectly rectangular. In such a case, it will be appreciated that there may not be a single constant width or a single constant height. In such a case the image processing module may therefore perform an image correction step in which the shape of the exposed region as extracted is processed to correct for perspective, viewing angle and the like, so as to result in a single corrected width and a single corrected height. Such image processing techniques are well known and are readily apparent to those skilled in the art. If the image processing module is unable to extract a height and width with sufficient accuracy and/or confidence the module may effectively reject the image captured by the user and request a replacement image be taken.

Instead of detecting the exposed region of the oleo, markers could be fixed at known locations on the landing gear such that the image processing module need only ascertain the width of the exposed inner sliding tube and the separation of the markers.

Additionally or alternatively, the measure of the amount of extension of the oleo may be ascertained by using image recognition of torque links and their relative geometry. The angle that a first torque link extends relative to a second torque link (with which it is paired) may for example be a relatively easy feature to recognise and one which relates via a simple mathematical relationship to the oleo extension. It will be appreciated that the absolute amount of extension of the oleo can be calculated from an image of the oleo that allows extraction of a first dimension proportional to the extension of the oleo (e.g. the height of the exposed region) and a second dimension proportional to the diameter of the oleo (e.g. the width of the exposed region) if the absolute diameter of the oleo is already known. It will also be appreciated that it is not necessary to calculate the H-value explicitly in order for the device to function. For example, the relationship data could relate (i) the temperature of the oleo, (ii) the ratio of aforesaid first and second dimensions and (iii) the gas pressure within the oleo.

The relationship data may be in the form of lookup tables. The relationship data may be in the form of one or more graphs, for example represented in digital form. The relationship data may be in the form of one or more mathematical models. It will be appreciated that the values or parameters processed by the processing module need not be absolute measures of the variables concerned (e.g. temperature, oleo extension and/or oleo gas pressure) but may be derived values. The relationship data may be held only temporarily in a memory store in the device.

The device preferably includes a display screen on which the image captured by the camera is displayed. The device may be arranged so that in use the image recognition module displays on the display screen both the image as captured and an indication of the parts of the image that have been recognised and analysed. The user may then be prompted to confirm that the parts of the image that have been recognised by the image recognition module are the correct parts. The display screen may form at least part of the output device.

The device may be arranged to accept a user input of the gas pressure within the oleo, for example as measured by other means. The device may for example include a gas pressure input module. The device may also be so arranged that the output provided by the output device is produced by means of comparing (a) the user input of the gas pressure within the oleo and (b) a pressure value representative of the expected pressure of the gas within the oleo as calculated by the processing module, said pressure value being in the same units as the gas pressure obtained by means of the user input. From such an output the user may ascertain whether the difference, if any, between the expected pressure and the measured pressure is acceptable. The processing module may be arranged to indicate whether the difference, if any, between the expected pressure and the measured pressure is acceptable. The device may in such a case be programmed with tolerance bands to enable such an indication to be made.

Preferably, one device according to the invention may be used to check the gas characteristic of many different aircraft landing gear oleos of different types. The device may be arranged to check a gas characteristic (e.g. pressure) of any one of a multiplicity of different types of aircraft landing gear oleos, each of which being so configured that the relationship between (i) the temperature of the oleo, (ii) the extension of the oleo and (iii) the gas pressure within the oleo, is different for each type of aircraft landing gear oleo. The device may be able to discern between different types of oleo. The device may be able to discern between different oleos, even those of the same type. For example, each of many oleos of one or more types may be uniquely identifiable by means of an identification code. The unique identification code could be in the form of an RFID chip. The unique identification code could be in the form of a bar-code. In the case where the device is useable with many different types of aircraft landing gear oleos, the device preferably has access to a database of aircraft landing gear oleos, the database including relationship data for each such aircraft landing gear oleo.

The database may be stored remotely from the device. The device may therefore be provided with the facility of interrogating the database via a network connection.

The device may include a landing gear oleo recognition module for recognising an aircraft landing gear oleo or its type. The device may be arranged to ascertain the relationship data corresponding to an aircraft landing gear oleo so recognised, for example from a database of such information. The landing gear oleo recognition module may include a scanning module for scanning and identifying the unique identification code associated with a landing gear oleo. The scanning module may for example be in the form of a bar-code scanning module. Such a scanning module may make use of the camera of the device. The landing gear oleo recognition module could additionally or alternatively operate by means of the user manually entering an ID code.

The device may be arranged to log data. Such data could be stored in a database so that the interaction of the device with a landing gear oleo is logged as an entry in the database against that particular landing gear oleo. Such data could be periodically uploaded to such a database.

The device of the first aspect of the present invention may be for checking a characteristic of the gas in an aircraft landing gear oleo when the aircraft is at rest.

The present invention also provides, according to a second aspect of the invention, a method of checking whether a characteristic of the gas in an aircraft landing gear oleo is acceptable or not. Such a method may include using a device according to the first aspect of the invention. The method of the second aspect of the invention may include the steps of capturing an image which depends on the amount of extension of the oleo, electronically processing the image to obtain an indication of the expected value of the characteristic of the gas in the oleo, and generating an output in dependence on that indication of the expected value. The method is preferably performed with the use of a hand-held electronic device, such as a smart phone, tablet or the like. The method may include a step of inputting a temperature value representative of the temperature of the oleo. The processing step may include processing (a) the temperature value and (b) relationship information that interrelates an oleo gas pressure value, the oleo temperature, and the amount of extension of the oleo, for the landing gear, and one or both of (c) the measure of the amount of extension of the oleo and (d) an independent pressure measurement concerning the pressure of gas in the oleo. The output generated is preferably such that the user may ascertain whether the characteristic of the gas in the aircraft landing gear oleo is at an acceptable level or not. The method may generate an expected pressure value from the inputted temperature value, the measure of the amount of extension of the oleo. The method may include electronically producing an output in dependence on such an expected pressure value. The method may include electronically comparing the expected pressure value so calculated with a measure of the pressure in the landing gear oleo obtained via other means. The method of the present invention may be performed when the aircraft is at rest.

The method may generate an expected H-value from the inputted temperature value and a measure of the pressure in the landing gear oleo obtained via other means. The method may include electronically producing an output in dependence on such an expected H-value and a measured H-value (equal to, or derived from, a measure of the amount of extension of the oleo extracted from the captured image). The method may include electronically comparing the expected H-value so calculated with the H-value as so measured from the captured image.

The method may thus include a step of determining whether the amount of gas in the landing gear oleo appears to be within acceptable limits or not. The method may include a step of removing or adding gas as appropriate, in dependence on the step of determining whether the amount of gas in the landing gear oleo appears to be within acceptable limits or not.

According to a third aspect of the invention there is provided a software product for programming a computer device to function as a device according to the first aspect of the invention or to perform the method according to according to the second aspect of the invention. For example the software product may include an image recognition module for processing an image and extracting a measure of the amount of extension of an oleo from a capture image. The image recognition module may include any of the features of the image recognition module as described and/or claimed herein. The software product may include a temperature input module as described and/or claimed herein. The software product may include a temperature measuring module as described and/or claimed herein. The software product may include a processing module as described and/or claimed herein. The software product may include a landing gear oleo recognition module, for example a bar-code scanning module, as described and/or claimed herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
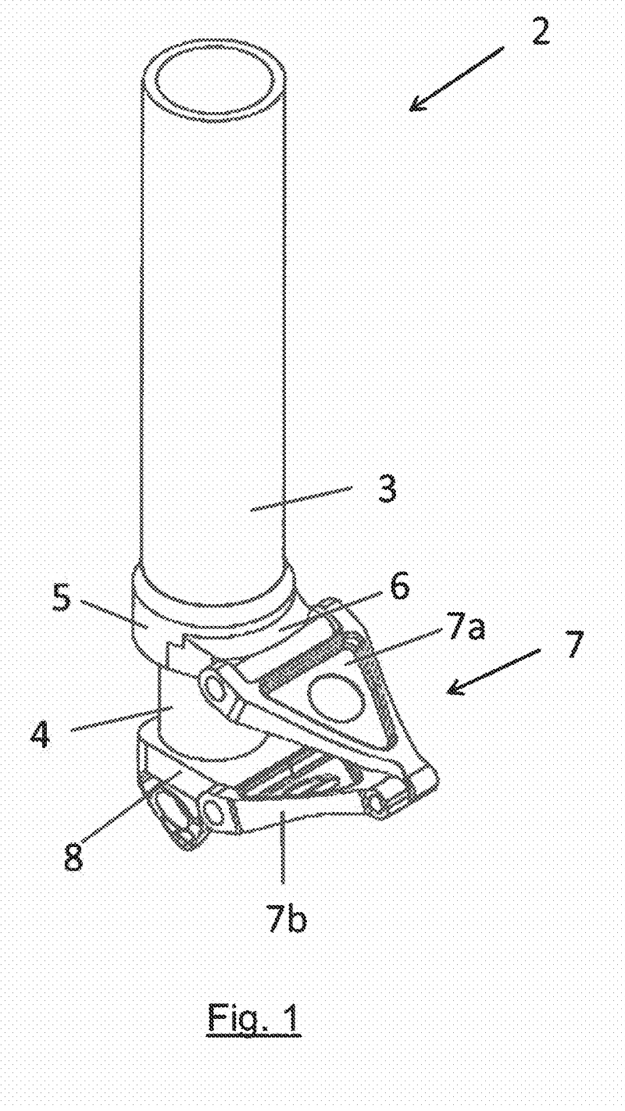
FIG. 1 shows a partial perspective view of a landing gear assembly the gas pressure of which can be measured by a device according to a first embodiment of the invention.
Figure 2:
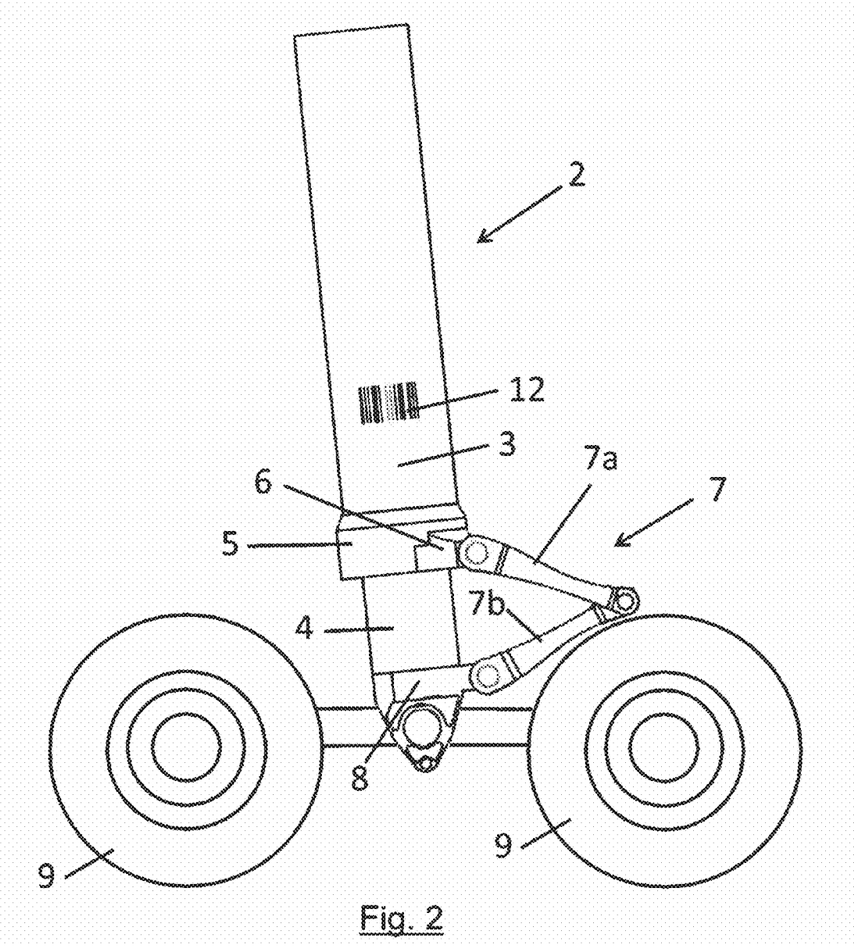
FIG. 2 shows the landing gear assembly of FIG. 1 as a side view.

FIGS. 1 and 2 show an aircraft landing gear of a type suitable for use with a first embodiment of the present invention. The aircraft landing gear includes a shock absorber 2, otherwise known to those skilled in the art as an oleo strut. Other parts of the landing gear (the axles for mounting the wheels, the upper part of the landing gear for receiving the oleo strut) have been omitted from the Figures for the purpose of clarity, although the wheels 9 are shown schematically in FIG. 2. The shock absorber 2 comprises a piston 4 received within a cylinder 3, as is conventional with such shock absorbers. The cylinder 3 is provided with a collar 5 which comprises a collar mount 6 onto which is pivotally attached a torque link 7. The torque link 7 is attached at its lower end to an axle mount 8 for receiving a wheel-bearing axle (not shown). The axle mount 8 is attached to the piston 4. The torque link 7 inhibits rotation of the piston 4 relative to the cylinder 3, as is well known to those skilled in the art. The torque link 7 comprises an upper torque link portion 7a and a lower torque link portion 7b which are pivotally connected to one another as is evident from FIGS. 1 and 2.

Figure 3A:
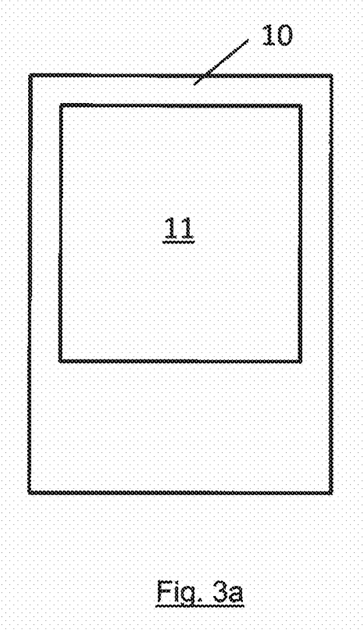
FIGS. 3a and 3b are front and rear views, respectively, of the device according to the first embodiment.
Figure 3B:
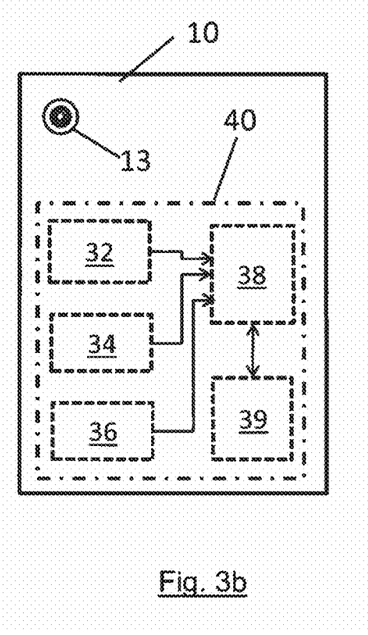

FIGS. 3a and 3b shows an electronic device 10 according to the first embodiment of the invention. The device 10 is a handheld mobile computing device (in this case a "smart phone") which is programmed with software (illustrated schematically in FIG. 3b by box 40) to check the gas pressure in the oleo pneumatic shock absorber by means of a semi-automated 'H' check. FIG. 3a shows the device 10 from the front and thus shows the display screen 11 on the front surface of the device 10. FIG. 3b shows the device 10 from the rear and thus shows the camera lens 13 on the rear surface. The camera 13 is able to capture an image from which the H value can be ascertained by the device 10. The device 10 includes a processor programmed with the software 40. The software 40 includes an image recognition module 32 for processing the image to extract the H value. The software 40 includes a temperature input module 34 for receiving an indication (manually measured and entered by the user) of the oleo temperature. The software 40 includes a pressure input module 36 for receiving an indication (manually measured and entered by the user) of the actual oleo pressure. The software 40 includes a processing module 38 with access to "stroke-load" data 39 stored in memory the device concerning the relationship between (i) the temperature of the oleo, (ii) the extension of the oleo and (iii) the gas pressure within the oleo. The processing module 38 correlates (a) the oleo temperature from the temperature input module 34 (b) the "stroke-load" data stored in memory 39, (c) the extracted H value from the image recognition module 32 and (d) the actual measured oleo pressure from the pressure input module 36 and outputs onto the display screen a message selected as appropriate from one of the following:

"Gear OVER pressurised—consult AMM"
"Gear Pressurisation OK (within +/−10 bar)"
"Gear UNDER pressurised—consult AMM"

It will be understood that "consult AMM" is an instruction to the user to consult the appropriate Aircraft Maintenance Manual to ascertain what further action must be taken.

Figure 4A:
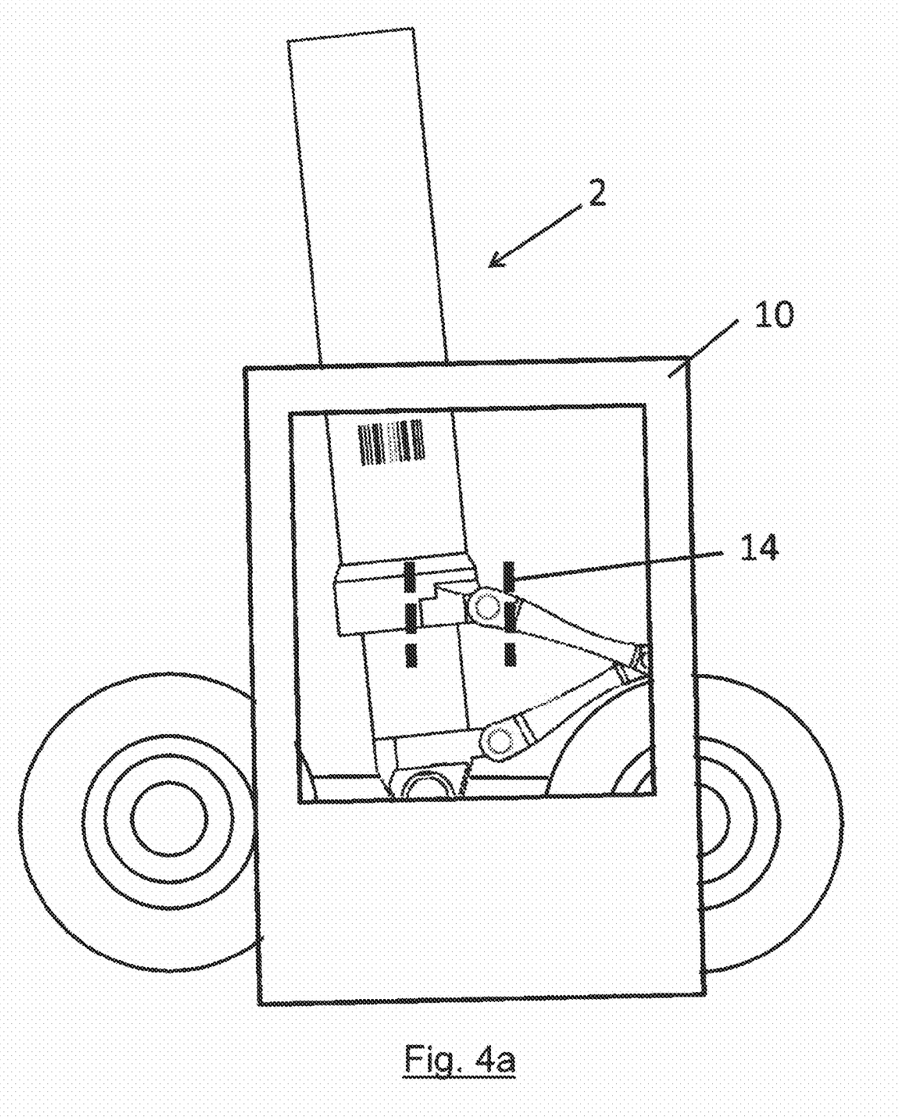
FIG. 4a shows the landing gear assembly of Figures and 2 and the device according to the first embodiment.
Figure 4B:
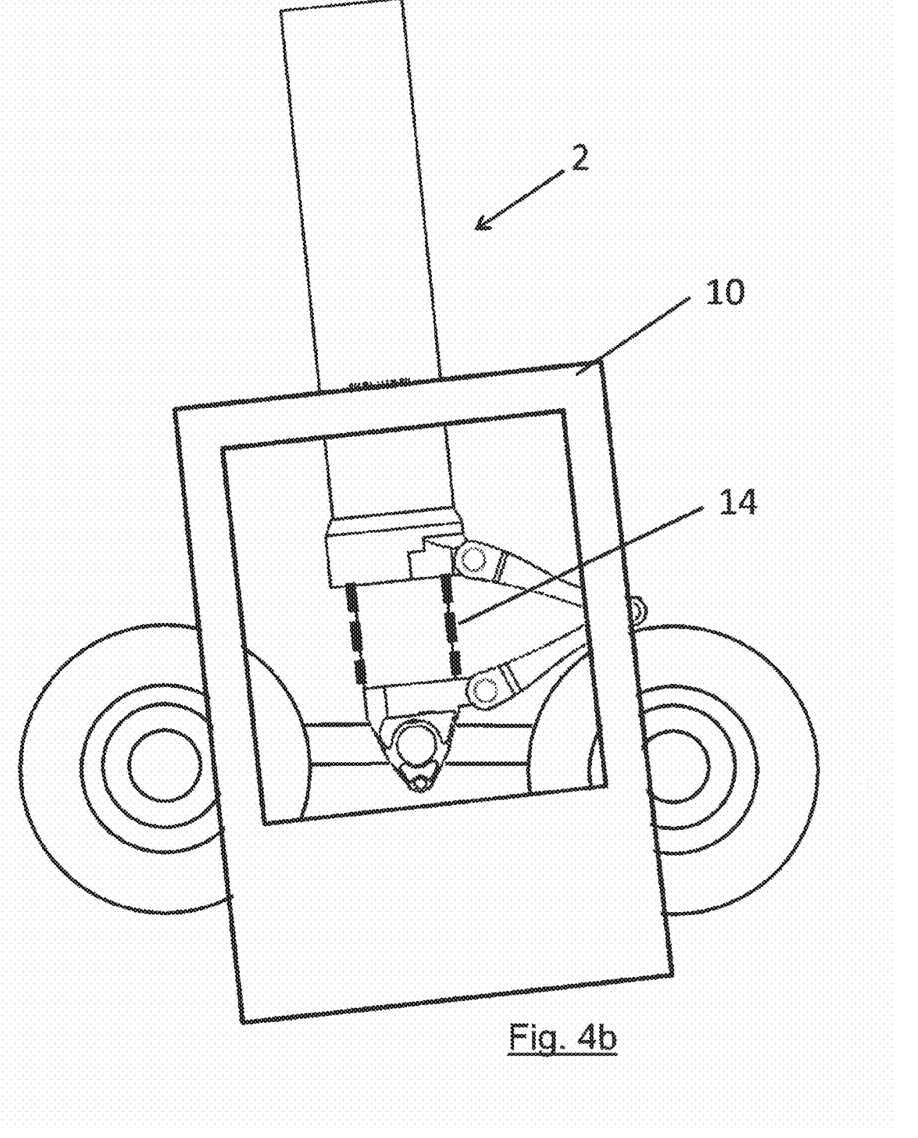
FIG. 4b shows the device according to the first embodiment capturing an image of the landing gear assembly.

Use of the device 10 of the first embodiment will now be described in further detail with reference to FIGS. 4a to 5.

Initially, the user turns on the device 10 and runs the software. The device 10 is then used to scan a barcode label 12 affixed to the external cylinder 3 of the oleo. The barcode is unique to each landing gear. The software then causes the device 10 to contact a remotely stored database, which it interrogates on the basis of the code represented by the bar-code. The database is held on a secure server to which the device 10 connects via a wireless network connection. The database holds details of relevant data for each landing gear including the details of the aircraft on which it is currently installed, associated relevant history, the diameter of the inner sliding tube 4 and the stroke load curve for the shock absorber. The data corresponding to the landing gear, and thus the aircraft, identified by the barcode scanned is downloaded onto device 10. The stroke load curve for the shock absorber is stored in memory 39. The software 40 then displays on the display screen 11 a message to the user to confirm the aircraft so identified. Once the aircraft and landing gear identified has been confirmed, the user is informed of any relevant previous service issues concerning the landing gear that have been recorded in the database.

The user is then asked to use the device 10 to enter the ambient temperature of the gear. In this embodiment this is done by the user using a separate thermometer that is placed in contact with the inner sliding tube 4 to take a reading and then manually entering the temperature.

The user is then instructed by the software to take a photo of the landing gear by means of the camera 13 on the rear surface of the device 10. The image viewed by the camera 13 is displayed on the front display screen 11. Two vertical lines 14 (see FIGS. 4a and 4b) are displayed and the user is expected to take a photo such that the two vertical lines 14 are lined up with the edges as seen on the display screen of the oleo inner tube 4. The user takes the photo and the device 10 then captures the image. The image is analysed by the image recognition module 32 of the device 10 with the use of standard image processing software in the image processing module that detects the edges of the inner sliding tube 4 and the region of the tube that is exposed. The outline of the exposed region is displayed to the user as a rectangle, the sides of which overlying the sides of the oleo inner sliding tube 4 (such that the width of the rectangle represents the diameter of the inner sliding tube 4) and the separation of the upper and lower edges of the rectangle representing the H value. The user is then asked to confirm that the software has correctly identified the outline of the exposed region of the oleo inner sliding tube 4. If the software 40 has not correctly identified the outline, then the user is asked to take the photo again. This might occur if for example, the camera angle is too far from a square-on direction or if there is poor image quality for whatever reason (the camera not being held still when the photo is taken, or there being insufficient lighting, for example). If however, the image recognition has correctly identified the extent of the exposed oleo inner sliding tube 4, the software then performs an H-value calculation. The scale of the photo can be determined by relating the width of the rectangular outline to the known diameter of the oleo inner sliding tube 4, which can then be used to calculate H from the height of the rectangular outline:

$$H = \frac{\text{Rectangle height}}{\text{width of rectangle}} \times \text{oleo inner tube diameter}$$

Figure 7:
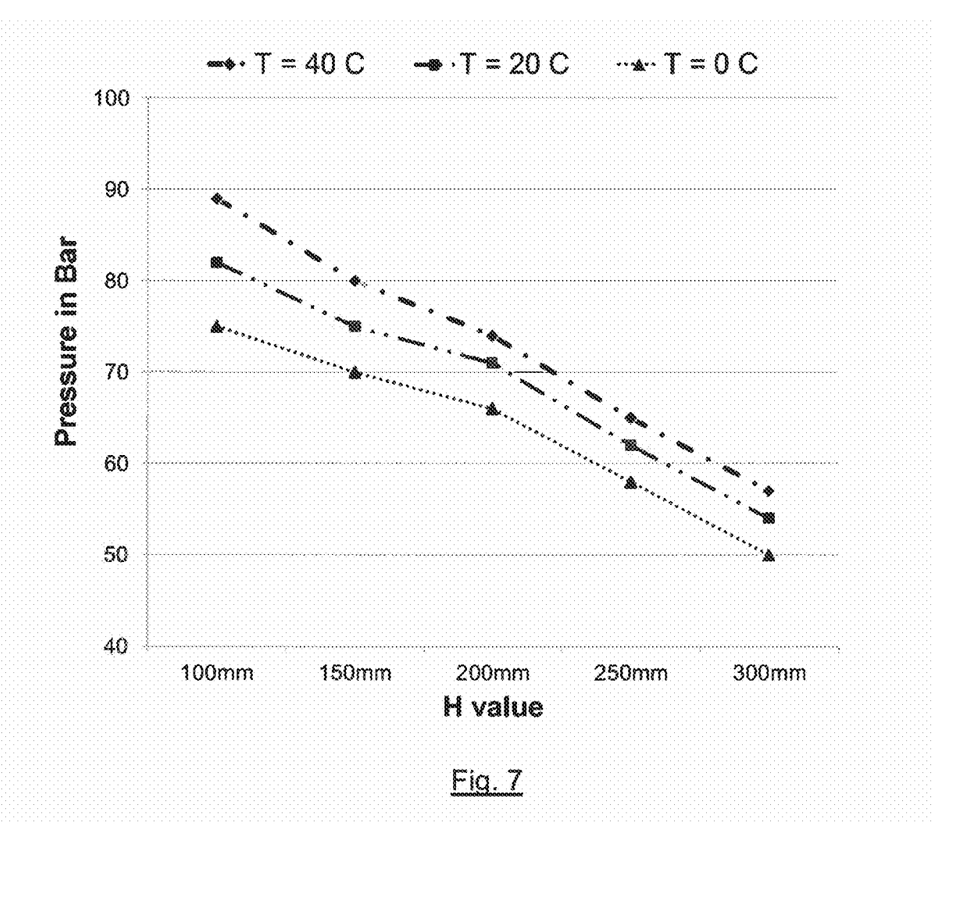
FIG. 7 is a graph illustrating the relationship between pressure and H-value of a landing gear oleo at three different temperatures.

The value of H as calculated corresponds to an internal pressure under a relationship that also depends on ambient temperature and the type of landing gear and the amount of gas in the landing gear. The amount of gas in the landing gear is fixed according to the expected operating conditions of the landing gear. If the ambient temperature is expected to be relatively high on average, then there may be less gas in the cylinder. If the ambient temperature is expected to be relatively low on average, then there may be more gas in the cylinder. The amount of gas is however typically fixed at one of a small number of different amounts and stays fixed long-term for a given landing gear. There is therefore a set load/stroke/ambient temperature relationship for each landing gear. FIG. 7 illustrates schematically the relationship on a single graph, which shows the load (pressure)/stroke (H-value) relationship for three different ambient temperatures. Data representing the relationship is held within the device by means of look-up tables and/or mathematical models/formulae such that the software is able to calculate an oleo internal pressure on the basis of the H value ascertained as described above and the ambient temperature as measured.

In this first embodiment, the user is asked to enter a pressure value as measured via the pressure check valve that is provided for this purpose. The device thus now has all the data required in order for it to calculate whether the measured pressure is consistent with the measured H-value. The device outputs via the display screen an appropriate message as mentioned above.

Figure 5:
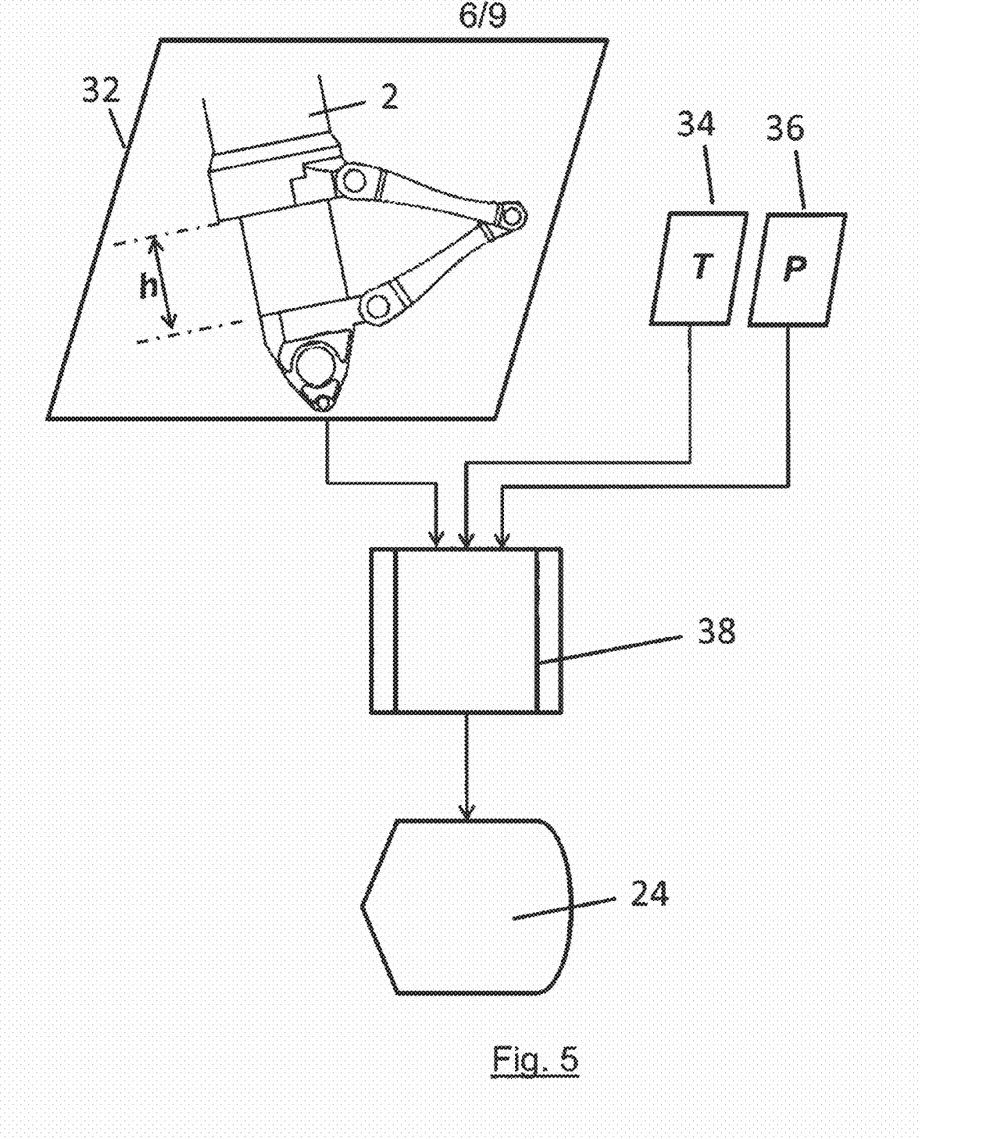
FIG. 5 is a flow diagram showing how the image captured by the device according to the first embodiment is processed.

FIG. 5 shows schematically an overview of the operation of the device 10 of the first embodiment. An image of the oleo 2 is processed by the image recognition module 32 to produce an H-value, h. The temperature input module 34 and the pressure input module 36 produce values for temperature, T, and actual oleo pressure, P. The processing module 38 of the software 40 processes those variables in view of the appropriate load-stroke data (chosen in dependence on temperature and the particular oleo in question, which should have a predetermined amount of gas in it, which can be identified in a database interrogated on the basis of the scanned bar-code associated with the oleo in question) to produce an output 24 which highlights the need for further action if the measured H-value, h, is inconsistent with the measured pressure, P, in view of the temperature, T, and the other factors determined by the particular oleo in question.

It will be appreciated that inconsistencies between the measured H value and the measured pressure can be determined by calculating the pressure corresponding to the measured H value and comparing with the measured pressure or by calculating the H value corresponding to the measured pressure and comparing with the measured H value. There can of course be acceptable differences in the two pressure measurements, for example resulting from stiction in the seals of the gear, giving an allowable pressure variation of up to 15 bar in some embodiments (although lower variations may in certain circumstances be deemed unacceptable—for example during a comprehensive service). Thus, a difference of 15 bar between measured and expected pressures and/or a difference of say 15 mm between measured and expected H values may, depending on the oleo/embodiment, indicate a need for further action.

In a second embodiment of the invention, the pressure as measured (and entered manually by the user) is displayed as part of the output alongside the expected pressure as calculated from the measured H value together with a message stating whether or not the difference, if any, between the measured and expected pressures is acceptable. FIGS. 6a to 6h illustrate a smart phone 110 that is used in performing the method of the second embodiment. The smart phone is programmed with a bespoke application (or "app") for performing the method.

Figure 6A:
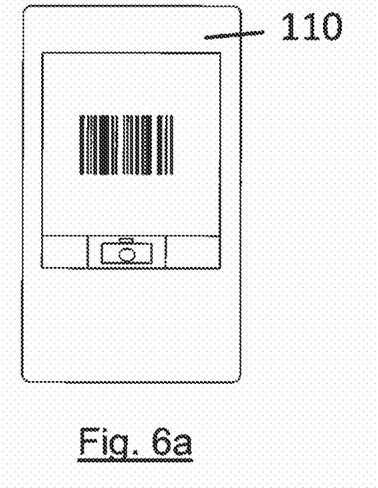
FIGS. 6a to 6h show the user interface of a device according to a second embodiment of the invention, in successive steps of a method of operation of that device.
Figure 6B:
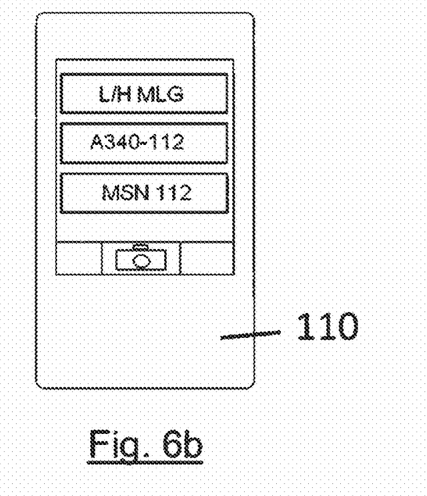
Figure 6C:
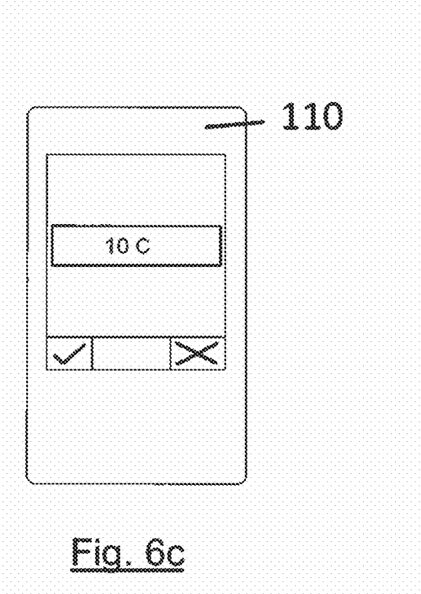

FIG. 6a shows the device 110 being used, by means of its camera (not shown), to scan a barcode on a landing gear oleo. The barcode is displayed on the display screen of the device. The barcode is converted into the corresponding unique identification number which is then used to extract from a remote database the data concerning the particular oleo concerned. The device is internet enabled and connects to the database via a secure connection across the internet. The data extracted from the database includes details such as the aircraft in which the oleo is installed the position and type of landing gear to which the oleo belongs, the load-stroke curves associated with the oleo, the diameter of the oleo and the service history. As shown in FIG. 6b, the device 110 displays sufficient data for the user to be able to confirm that the barcode has been correctly scanned and that the corresponding identification code has enabled extraction of the correct and corresponding data for the oleo in question.

The user is then required (see FIG. 6c) to confirm the temperature of the oleo which in this case is indicated by means of a temperature-sensitive strip fixed to the oleo outer casing and readily read by the user. Other means of measuring the temperature are of course possible.

Figure 6D:
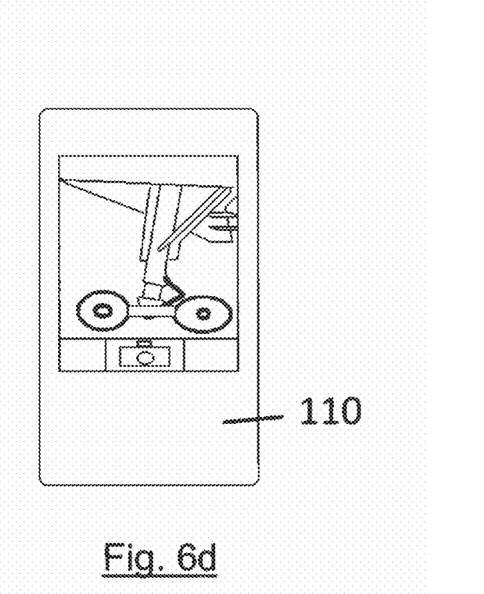
Figure 6E:
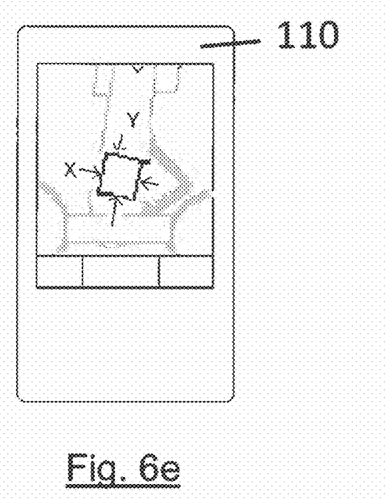
Figure 6F:
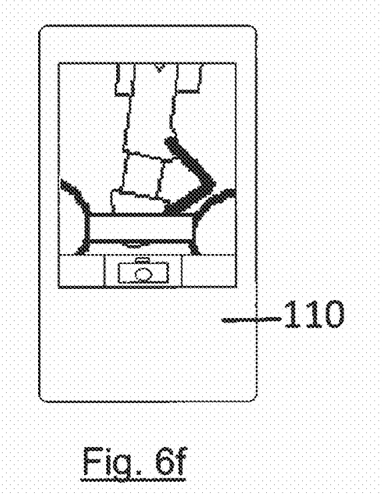

With reference to FIGS. 6d to 6f, the user is then required to use the camera of the device to capture an image of the landing gear. The device is put into camera mode (FIG. 6d) and image recognition software performs edge recognition in real-time such that the device displays a rectangle of best-fit in relation to the landing gear image in the field of view of the camera. When the user is satisfied that the sides of the rectangle (providing the "X" dimension shown in FIG. 6e) match the sides of the exposed oleo and the upper and lower edges of the rectangle (providing the "Y" dimension shown in FIG. 6e) match the upper and lower bounds of the exposed oleo the user presses a button (or soft-key) the captures the image (see FIG. 6f). The ratio of the X and Y dimensions can be used together with the extracted diameter of the oleo to calculate the H-value corresponding to the oleo extension. That H-value can then be used, with the temperature as ascertained in the step illustrated by FIG. 6c, to calculate from the relevant load-stroke curve the expected oleo gas pressure. The calculated pressure is displayed to the user (see FIG. 6g). Optionally, the user can then enter the actual pressure as measured by other means and have the device decide whether or not the difference, if any, is acceptable or not. If not an appropriate message is displayed to the user advising whether the oleo needs extra gas or less gas.

Figure 6G:
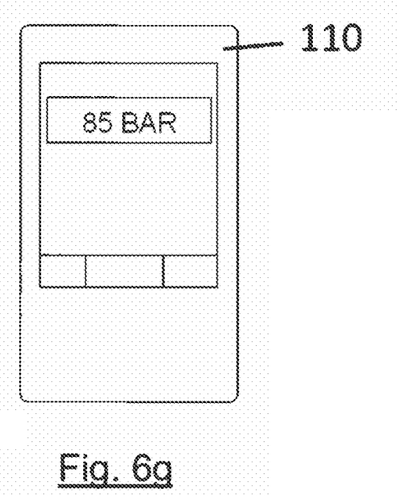
Figure 6H:
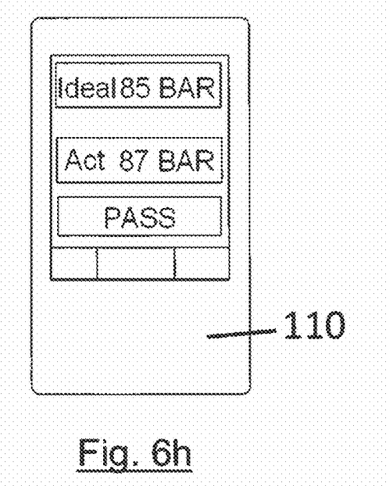

The software thus ascertains whether the difference, if any, between the calculated pressure value as calculated by the device 110 and the directly measured pressure value is sufficiently small as to be acceptable or whether the difference is greater than a preset threshold, thus indicating a need for further investigation and/or remedial action. A significant difference between the expected (predicted) gas pressure and the actual (measured) pressure indicates that there is a need for further checks. The oleo may for example be overfilled or under-filled with gas. In such a case, the device makes an appropriate output. The temperature reading, the actual pressure reading, the calculated pressure reading, and the time and date of measurement are logged and the corresponding data is sent by the device to the database for storage in the relevant record of the database.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The temperature input may be automated. A sensor may be attached or linked to the device. Temperature could be sensed by the camera of the device by means of detecting the colour of a temperature sensitive thermochromatic strip on the external cylinder and relating that to the oleo temperature. A more automated but possibly less accurate way of gauging the oleo temperature is simply to use the atmospheric temperature in the local area, which might be more readily determined for example if such data could be downloaded wirelessly from a suitable local weather information provider/service.

The output of the device could instead be an indication of the expected H-value (as determined from the directly measured oleo pressure) and the semi-automatically measured H-value.

The user interface and/or feedback provided by the device could be aural as well as or instead of visual.

The unique identifier need not of course be in the form of a barcode but could be a machine readable number or other unique identifier.

Data may be stored locally on the device reducing, or even eliminating, the need for the device to access a remote database, when in the field. Such local data may be downloaded and/or updated on the device from time to time.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of checking whether a characteristic of the gas in an aircraft landing gear oleo is acceptable or not for an aircraft which is at rest, the oleo comprising an inner sliding tube having a known diameter and an outer covering in which the inner sliding tube slides, the exposed region of inner sliding tube being indicative of the amount of extension of the oleo, the method comprising the following steps:
   capturing an image which depends on the amount of extension of the oleo with a hand-held electronic device, the image comprising said exposed region,
   measuring a width and height of the part of the image that defines the exposed region with the hand-held electronic device,
   deriving the amount of extension of the oleo with the hand-held device from the measured width and height of the part of the image that defines the exposed region and from the known value of the diameter of the inner sliding tube,
   obtaining an indication of the expected value of the characteristic of the gas in the oleo with the hand-held device from the amount of extension of the oleo,
   outputting with the hand-held electronic device an output in dependence on that indication of the expected value, providing a measure of the pressure in the landing gear obtained by other means, and generating an expected pressure from the measure of extension of the oleo and comparing the expected pressure to the pressure in the landing gear obtained by other means.

2. The method according to claim 1, wherein the hand-held device comprises a display screen on which the captured image is to be displayed, the step of capturing an image comprising displaying on the display screen one or more markers, arranging the hand-held device so that the exposed region of the inner sliding tube is visible on the display screen and so that the position of the markers on the image correspond to certain features of the oleo, and then capturing an image for processing.

3. The method according to claim 2, wherein the one or more markers comprises two lines, said method comprises arranging the held-held device so that the markers are positioned on the edges of exposed region of the inner sliding tube.

4. The method according to claim 1, wherein the hand-held device comprises a display screen on which the captured image is to be displayed, the method comprising displaying on the display screen the captured image and the parts of the image that have been recognised and analysed.

5. The method according to claim 1 further comprising a step of inputting a temperature value representative of the temperature of the oleo.

6. The method of claim 5 further comprising processing (a) the temperature value and (b) relationship information that interrelates an oleo gas pressure value, the oleo temperature and the amount of extension of the oleo, and one or both of (c) the measure of the amount of extension of the oleo and (d) an independent pressure measurement concerning the pressure of gas in the oleo.

7. The method according to claim 5 further comprising generating an expected pressure value from the inputted temperature value and the measure of the extension of the oleo.

8. The method according to claim 5 further comprising generating an expected oleo extension from the inputted temperature value and a measure of the pressure in the landing gear obtained by other means.

9. The method according to claim 1 further comprising a step of determining whether or not the amount of gas in the oleo appears to be within acceptable limits.

10. The method according to claim 9 further comprising a step of removing or adding gas to the oleo in dependence on whether or not the amount of gas in the oleo appears to be within acceptable limits.

11. A method of checking whether a characteristic of the gas in an aircraft landing gear oleo is acceptable or not for an aircraft which is at rest, the oleo comprising an inner sliding tube having a known diameter and an outer covering in which the inner sliding tube slides, the exposed region of inner sliding tube being indicative of the amount of extension of the oleo, the method comprising the following steps:
   capturing an image which depends on the amount of extension of the oleo with a hand-held electronic device, the image comprising said exposed region,
   measuring a width and height of the part of the image that defines the exposed region with the hand-held electronic device,
   deriving the amount of extension of the oleo with the hand-held device from the measured width and height of the part of the image that defines the exposed region and from the known value of the diameter of the inner sliding tube, obtaining an indication of the expected value of the characteristic of the gas in the oleo with the hand-held device from the amount of extension of the oleo, outputting with the hand-held electronic device an output in dependence on that indication of the expected value, inputting a temperature value representative of the temperature of the oleo, generating an expected pressure value from the inputted temperature value and the measure of the extension of the oleo, and comparing the expected pressure value with a measure of the pressure in the landing gear oleo obtained via other means.

12. A method of checking whether a characteristic of the gas in an aircraft landing gear oleo is acceptable or not for an aircraft which is at rest, the oleo comprising an inner sliding tube having a known diameter and an outer covering in which the inner sliding tube slides, the exposed region of inner sliding tube being indicative of the amount of extension of the oleo, the method comprising the following steps:

capturing an image which depends on the amount of extension of the oleo with a hand-held electronic device, the image comprising said exposed region, measuring a width and height of the part of the image that defines the exposed region with the hand-held electronic device, deriving the amount of extension of the oleo with the hand-held device from the measured width and height of the part of the image that defines the exposed region and from the known value of the diameter of the inner sliding tube, obtaining an indication of the expected value of the characteristic of the gas in the oleo with the hand-held device from the amount of extension of the oleo, outputting with the hand-held electronic device an output in dependence on that indication of the expected value, inputting a temperature value representative of the temperature of the oleo, generating an expected oleo extension from the inputted temperature value and a measure of the pressure in the landing gear obtained by other means, and wherein the expected oleo extension and the measured oleo extension are compared, and electronically producing an output dependent on said comparison.

13. A method of checking whether a characteristic of the gas in an aircraft landing gear oleo is acceptable or not for an aircraft which is at rest, the oleo comprising an inner sliding tube having a known diameter and an outer covering in which the inner sliding tube slides, the exposed region of inner sliding tube being indicative of the amount of extension of the oleo, the method comprising the following steps:

capturing an image which depends on the amount of extension of the oleo with a hand-held electronic device, the image comprising said exposed region, measuring a width and height of the part of the image that defines the exposed region with the hand-held electronic device, deriving the amount of extension of the oleo with the hand-held device from the measured width and height of the part of the image that defines the exposed region and from the known value of the diameter of the inner sliding tube, obtaining an indication of the expected value of the characteristic of the gas in the oleo with the hand-held device from the amount of extension of the oleo, outputting with the hand-held electronic device an output in dependence on that indication of the expected value, providing a measure of the pressure in the landing gear obtained by other means, and generating an expected extension value of the oleo from the measure of the pressure in the landing gear obtained by other means, and comparing the expected oleo extension to the measure of the extension of the oleo.

14. The method according to claim 13, wherein the hand-held device comprises a display screen on which the captured image is to be displayed, the step of capturing an image comprising displaying on the display screen one or more markers, arranging the hand-held device so that the exposed region of the inner sliding tube is visible on the display screen and so that the position of the markers on the image correspond to certain features of the oleo, and then capturing an image for processing.

15. The method according to claim 13, wherein the hand-held device comprises a display screen on which the captured image is to be displayed, the method comprising displaying on the display screen the captured image and the parts of the image that have been recognised and analysed.

16. The method according to claim 13 further comprising a step of inputting a temperature value representative of the temperature of the oleo.

17. The method according to claim 13 further comprising a step of determining whether or not the amount of gas in the oleo appears to be within acceptable limits.

* * * * *

UNITED STATES PATENT AND TRADEMARK OFFICE
CERTIFICATE OF CORRECTION

PATENT NO. : 9,978,189 B2
APPLICATION NO. : 14/404250
DATED : May 22, 2018
INVENTOR(S) : Fraser Wilson et al.

Page 1 of 1

It is certified that error appears in the above-identified patent and that said Letters Patent is hereby corrected as shown below:

On the Title Page

The PCT Filed should read as follows:
(22) PCT Filed: May 23, 2013

Signed and Sealed this
Twenty-first Day of August, 2018

Andrei Iancu
*Director of the United States Patent and Trademark Office*